May 15, 1934.   L. B. SKINNER   1,959,086
PROCESS OF TREATING PHOSPHATES
Filed Jan. 28, 1930   2 Sheets-Sheet 1

Inventor
Lewis B. Skinner,
By Steward McKay
Attorneys

May 15, 1934.                L. B. SKINNER                1,959,086
                        PROCESS OF TREATING PHOSPHATES
                        Filed Jan. 28, 1930    2 Sheets-Sheet 2
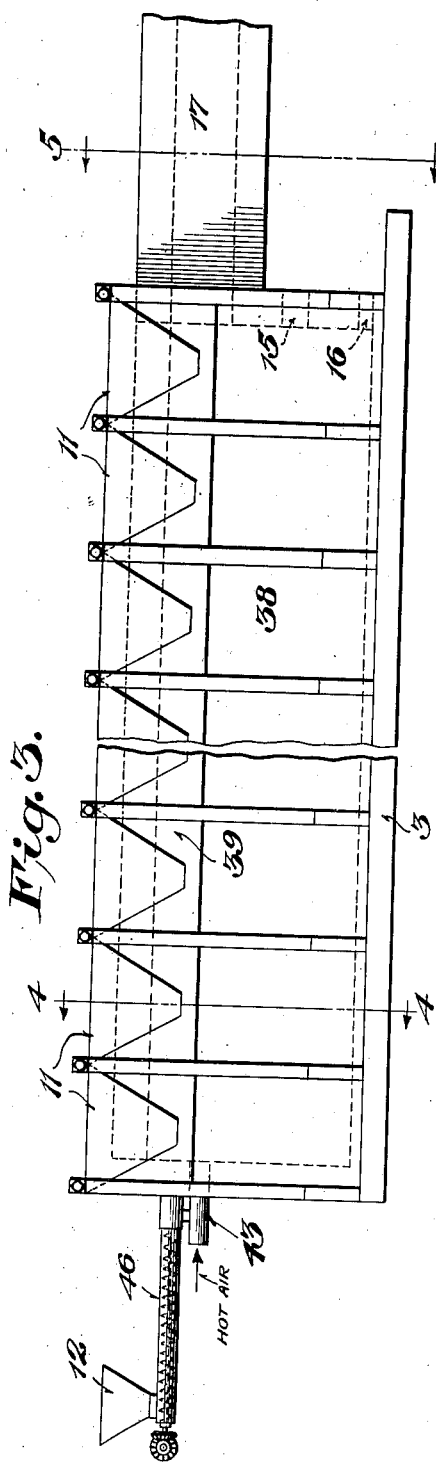
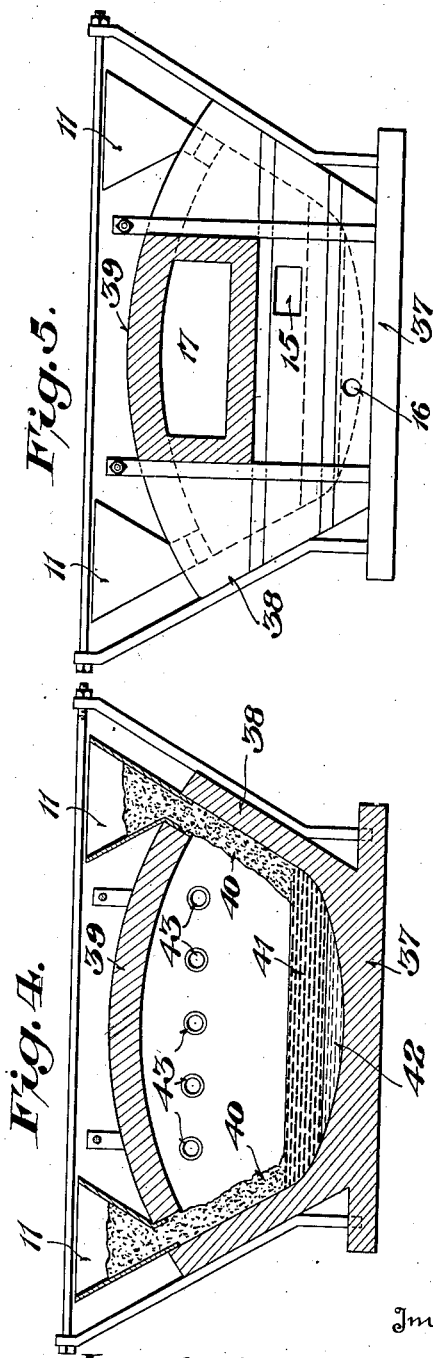
Inventor
Lewis B. Skinner,
By Steward & McKay
Attorneys Patented May 15, 1934

1,959,086

UNITED STATES PATENT OFFICE 1,959,086

PROCESS OF TREATING PHOSPHATES

Lewis B. Skinner, Denver, Colo.

Application January 28, 1930, Serial No. 424,109

15 Claims. (Cl. 23—165)

This invention relates to process of and apparatus for treating phosphates to obtain phosphorus, phosphoric acids or other phosphorus compounds therefrom.

While there is considerable demand for elementary phosphorus for matches, and for phosphoric acids for use in baking preparations, in rustproofing compositions and in the chemical trade generally, the principal demand for phosphorus material is for fertilizers.

The ordinary form in which phosphorus occurs is tricalcium phosphate, $Ca_3(PO_4)_2$, found both as rock and also as the chief mineral constituent of bones. This compound is insoluble in water and hence not available as a plant food.

The problem to be solved is the cheap production of soluble phosphatic material in concentrated form. At the present time the preparation of phosphatic fertilizers is usually accomplished by treating phosphate rock with sulphuric acid in an amount sufficient to convert the phosphoric acid content into plant-available compounds. This produces what is known as "acid phosphate" and consists essentially of a mixture of mono-calcium phosphate and calcium sulphate ($CaH_4(PO_4)_2 + 2\ CaSO_4$). As the original rock, after such cleaning and concentrating as is practicable, is only about 70% tri-calcium phosphate, the acid phosphate made therefrom will not run much over 16% $P_2O_5$. For various reasons in the manufacture of low grade fertilizers, calcium sulphate, which is substantially inert so far as fertilizing value is concerned, is not removed. Consequently the farmer has to pay for the transportation and handling of a large amount of useless material.

The difficulties and expense involved in preparing substantially pure phosphoric acid by the action of sulphuric acid on calcium phosphate have led to various proposals to form phosphoric acid from such material by pyrolytic methods.

Some have proposed the action of heat alone. Others have suggested decomposing calcium phosphate by silica according to the equation

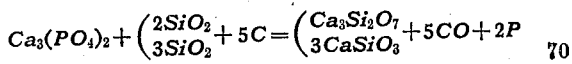

This reaction requires the application of heat sufficient to volatilize the phosphorus pentoxide, i. e., around 1800° C. or higher, so that the latter may be continuously withdrawn as a vapor allowing the reaction to proceed in that direction. Temperatures of 1800° C. or higher are best obtained commercially in an electric furnace, but this is an expensive matter. If, however, carbon is added elementary phosphorus may be driven off at a much lower temperature. This decomposition begins at around 1085° C. instead of 1800° C. While in treating phosphate rock, for example, in this manner a number of reactions doubtless occur, including the formation of carbides, phosphides and free iron and the subsequent reaction between such compounds and the oxygen of the phosphates or of phosphorus pentoxide or other oxide of phosphorus, the main reaction, at least as far as final results are concerned, appears to be somewhat as follows:—

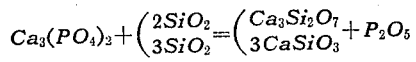

Attention is called to the fact that the proportion of silica is variable and may range between two and three molecules or even be outside of these limits, though best results are usually obtained within the range above specified.

While the last mentioned reaction commences at 1085° C., it proceeds much more rapidly as the temperature increases and, therefore, the temperature should be around 1300° to 1400° C. This temperature may readily be obtained by combustion of fuel and does not require an electric furnace.

Efficient heating of materials by fuel combustion involves not only a maximum production of heat per unit of fuel used (i. e., substantially complete oxidation of combustible) but also efficient and convenient heat-transfer from the heating gases to the charge to be heated.

Obviously partial combustion of fuel to give a reducing atmosphere consisting chiefly of carbon monoxide, some hydrogen and nitrogen produces far less heat than where the combustion is carried substantially to completion. For the desired reaction to occur, however, there must be a reducing atmosphere within and immediately adjacent the surface of the charge; so that the problem is presented of maintaining such reducing conditions within and adjacent the charge while at the same time maintaining the necessary efficient oxidizing conditions in the flame and combustion gases employed to heat such charge.

The simple statement of that problem eliminates the blast furnace since in such furnace as a means for realizing the desired operating conditions, the heating gases pass through the charge and consequently determine whether the voids in the charge shall be filled with oxidizing or with reducing gases. Other disadvantages of the blast furnace as a means of making phosphorus pentoxide will be referred to later.

One method of maintaining a reducing atmosphere in the charge when the heating gases are oxidizing in character is to heat the charge in closed retorts or muffle chambers. This method involves troubles of all kinds, such as intermittent operation due to the necessity for charging and recharging the retorts periodically, low rate of heat transfer through partition walls and through the mass itself to the core, expense of retort renewals, and so forth.

In accordance with the principles of the present invention, the stated difficulties of prior practice are avoided and highly important technical advantages, including efficient fuel combustion, are realized by reverberatory heating of the charge while constantly maintaining within the charge and immediately adjacent any exposed outer surface thereof an atmosphere that is substantially free of both oxygen and carbon dioxide and hence non-oxidizing toward phosphorus. Under these conditions free phosphorus is evolved within the charge and leaves the same at its exposed surface, traveling therebeyond at first in the non-oxidizing environment provided by the strongly reducing gaseous protective layer maintained immediately over such exposed surface, and only thereafter encountering the oxidizing heating gases beyond said layer and being thereby converted into phosphorus pentoxide. The evolved free phosphorus is thus enabled actually to travel an appreciable distance away from the still largely unmelted charge before entering an oxidizing environment, and consequently its oxidation to phosphorus pentoxide occurs wholly out of contact with the charge, the pentoxide being swept out of the heating zone with the combustion gases and subsequently recovered by appropriate separation therefrom. Were precautions not taken to ensure maintenance of these operating conditions, oxidation of the evolved free phosphorus would occur upon the exposed surface of the charge and/or in the subadjacent portions of the charge; and the resultant phosphorus pentoxide would then react to re-form calcium phosphate which, as already explained, is unacted upon by silica alone at 1300° to 1400° C., such reaction occurring only at much higher temperatures, in the neighborhood of 1800° C., quite impracticable to employ in a procedure of this kind. The result would eventually be a virtual "freezing" of the charge and stoppage of the treatment.

An especially desirable practical way to maintain the aforesaid protective layer or covering of reducing gases constantly over the exposed or free surface of the charge, and thus to ensure that the latter is substantially at all times definitely spaced away from and uncontacted by the oxidizing atmosphere beyond, is to introduce the charge in a steady stream or sheet along the opposite side walls of the reverberatory furnace employed in practicing the process. In this way each of the resultant lateral charge piles presents but one exposed or unconfined face, which extends along one side of and in generally parallel relation to the stream of flame and hot combustion gases sweeping centrally through the furnace between said piles. Since the exposed face of each charge pile is outside the main current of said stream, there is substantially no impingement of the stream upon such exposed face. Also there is a relatively gentle slow-moving passage of gases at the sides of the stream in comparison with the much greater velocity of flow in the middle of the stream. Therefore the protective layer of reducing gases formed and constantly renewed by the continuous outflow of such gases from the exposed or unconfined face of each lateral charge pile, due to the reactions induced by the reverberatory heating of the charge, can be maintained virtually intact to perform its intended function already described. This is especially so because, since the opposite face of each lateral charge pile is positively confined by the corresponding side wall of the reverberatory chamber, the elemental phosphorus, carbon monoxide, hydrogen etc. constantly being formed in the highly heated charge are forced uniformly to flow outwardly to the one exposed face of the pile and thence beyond said face to renew said protective layer. This layer is therefore not merely a passive instrument of protection but acts with particular effectiveness, by reason of the compulsory unidirectional flow of evolved reducing gases under the described operating conditions, to positively repel approach of the oxidizing furnace atmosphere and to prevent contact thereof with the surface of the charge, as well as its penetration into the charge.

Such results are not attainable with center charging. In the first place, the resultant central charge pile would be directly in the path of the flame and gas stream and directly impinged thereby, this in itself rendering it impossible to maintain the protective non-oxidizing protective gaseous layer characterizing the present process. Moreover, such a pile being altogether exposed or unconfined laterally, and since the voids in the material of the charge provide more than ample space for gas movement therethrough, the generated reducing gases could emerge at any part of the charge pile, or first at one place and then at another, depending upon the necessarily more or less irregular pressure fluctuations inevitably occurring in the surrounding furnace atmosphere. Should there be a temporary movement of reducing gases in one direction, thus causing them to escape from one side or face of the pile, there would be a corresponding entry or penetration of oxidizing gases in the same direction into the opposite side of the pile with consequent nullification of the reduction of phosphorus. And another variation in the outside pressure would then cause the reducing gases to reverse their direction of flow and to emerge at the other side of the charge pile. There would thus be a non-uniform, shifting direction of flow, further precluding the possibility of maintaining the non-oxidizing gaseous protective layer at the exposed surface of the charge. The resultant reformation of calcium phosphate in and upon the surface of the charge pile and its infusibility at the desired operating temperatures renders successful working a practical impossibility under such conditions.

In the present process, the steady flow of reducing gases from the charge into the furnace and the reduction of a part at least of the carbon dioxide in the firing gases to carbon monoxide by the oxidation of the phosphorus results in a flue gas which, after the separation of the phosphoric acid, has the composition of weak producer gas and may be utilized as such.

One objection to the use of a blast furnace for bringing about the decomposition of the phosphates has already been mentioned, viz: inefficiency in fuel consumption owing to the necessity for maintaining reducing conditions, especially since reducing conditions in phosphate decomposition involve substantial absence of carbon dioxide and not merely presence of small amounts of reducing gases such as carbon monoxide or hydrogen.

A further objection to the use of a blast furnace is that it is not suitable for operations requiring considerably time to bring to completion. Blast furnace treatment may be said to be "flash" treatment while reverberatory treatment may be said to be "soaking" treatment. In a blast furnace, the charge, consisting of phosphate rock, flux and reducing material forms a vertical column through which heated gases pass. Even when briquetting is performed all molten slag material, immediately upon being formed, drains away rapidly from the reducing material and the still unfluxed rock and silica. When this molten slag reaches the bottom of the furnace it forms a relatively deep pool with only a small exposed upper surface. This exposed surface, moreover, being adjacent the tuyères is not subjected to reducing conditions and hence any phosphatic material remaining therein has no opportunity for reduction.

When a reverberatory is employed the lake of slag may be exposed to full furnace temperature as long as desired and, by using enough reducing material to leave particles of carbon floating on the molten charge and slag surface, the desired reducing conditions may be maintained during such heat treatment. The carbon which remains floating on the molten mass of charge and slag functions both as a reductor and a protective agent, and eventually also as a supplemental source of heat. Such carbon travels along with the slag for some distance toward the tapping end of the furnace, being eventually burned off by the excess of oxygen, say 3 or 5 per cent, in the furnace gases which normally run 13 to 15 per cent carbon dioxide, or by the carbon dioxide with the formation of carbon monoxide.

In practice I have found it advantageous to use a long furnace, say 60 to 65 feet in length and 15 to 20 feet wide so that with the greater part of the reduction and fusion occurring in the firing half of the furnace, the molten mass has to travel at least forty feet on the average before it is withdrawn. By such operation I have been able to produce slags containing not more than 0.5% phosphorus pentoxide.

A still further disadvantage of blast furnace operation is the fact that fine materials cannot be used without first briquetting them into aggregates of considerable size, otherwise the heating gases cannot penetrate the charge. The briquetting must be well done since the briquettes have to withstand the weight of the superincumbent charge without crushing. Obviously this is an expensive as well as a troublesome operation.

In a reverberatory fine material may be used to advantage without briquetting, as the only movement of gas required within the charge is a slow oozing of carbon monoxide and hydrogen outwardly into the furnace carrying with them the phosphorus vapors.

A still further objection to blast furnace operation is the excessive produceion of flue dust. The high pressure blast coupled with the passage of the gases under pressure through the charge produce far greater quantities of flue dust than is the case with a reverberatory, where the heating gases are not under pronounced pressure and do not pass through either the charge or the slag formed therefrom.

As the employment of relatively high temperatures 1200° C. or above, is distinctly advisable in the practice of my process, the firing proper of the furnace is best effected by the combustion of a suitable fuel with the aid of preheated combustion air. Most advantageously this is effected by utilizing the intensely hot dust-laden gases passing from the furnace to preheat the air for combustion.

Heat regenerators are of two types. The first type includes those in which the flow of the heating gases and the gases to be heated through the structure is continuous and the heat transference is by conduction through a separating wall. This method of heat exchange is known as the double surface system. The second type involves the intermittent flow of the heating and heated gases alternately through the same structure, usually a checkerwork of firebrick. This type of heat exchanger depends on alternately heating and cooling large surfaces of refractory material. Where the first type of regenerator is used it is very desirable to have separating walls having high heat conductivity per unit area of exposed surface. Now walls of refractory materials like firebrick must have relatively great thickness to give adequate mechanical strength and this thickness coupled with a very low specific heat conductivity results in poor heat exchange by conduction through such walls.

Checkerwork has the advantage that only surface heating of the firebrick is necessary, but when checkerwork is used difficulties arise in cases where the heating gases carry large amounts of material in suspension. In such cases the checkerwork acts as a collecting means and the spaces between the bricks rapidly silt up.

The difficulty with regard to silting up experienced with checkerwork may be avoided by using heat regenerators of the first type, using metal, usually iron or steel, separating walls and large spaces or passages for the heating gases. In the case of phosphoric acid manufacture, however, new problems arise, chiefly the fact that in such manufacture the temperature of the heating gases is 1100° to 1200° C. or more and iron cannot be heated above 800–900° C. without destruction. I have discovered, however, a remarkable fact which enables me to use iron air pipes in the heat exchanger with perfect satisfaction. The fact is that by operating slowly and carefully at first a coating may be built up around the iron which provides the necessary protection for the iron without preventing the desired transference of heat from the heating gases to the air.

Examination of the coating formed reveals the fact that it is formed from a mixture of flue dust and phosphorus pentoxide, although its final composition is uncertain and may include calcium phosphates, metaphosphoric acid and other compounds. The dust itself is not adherent. Therefore the coating must be produced by the combined action of two materials, neither of which alone is capable of producing such a coating.

The coating exerts its protective action as the result of the low heat conductivity of the coating as compared with the metal it protects. Assuming the final air (i. e. the heated gas) temperature within the pipe is 500° C. with the inner surface of the metal at 690° C. while the temperature of the flue (i. e. heating) gases around such pipe is 1200° C. With equal thicknesses of metal and coating and a heat conductivity ratio of 10:1 for metal and coating respectively the temperature drop between the outer surface of the coating and the inner surface of the pipe will be divided in approximately the same ratio, so that the temperature of the outer surface of the iron will be around 660° C. or well below the softening or destruction point of iron or steel.

The composition of the charge requires the proper proportioning of the ingredients to form a readily fusible slag on the one hand and on the other liberate the phosphorus as elemental phosphorus. The first involves the proper proportioning of the basic and acid constituents of the charge and the second the addition of sufficient reducing material to liberate the elemental phosphorus.

In proportioning the basic and acidic constituents of the charge the composition of the material treated has to be taken into consideration. Many phosphate rocks contain silica, silicates, calcium carbonate and other slag forming substances. One form of phosphate rock tested was found to be self-fluxing and did not require any addition of silica to give a slag readily fusible at 1300° to 1400° C. A sample of this rock gave the following analysis:—

| | |
|---|---|
| CaO (as $Ca_3(PO_4)_2$) | 22.43 |
| CaO (as $CaCO_3$) | 9.56 |
| $P_2O_5$ | 20.05 |
| $SiO_2$ | 25.50 |
| $Fe_2O_3$ | 2.35 |
| $Al_2O_3$ | 5.50 |
| MgO | 2.56 |
| Water, $CO_2$ etc. | 12.05 |
| | 100.00 |

In determining the charge composition any alumina is considered as combining with the lime to form calcium aluminate $CaAl_2O_4$, thereby reducing the amount of silica necessary for forming slag. One part by weight of magnesia is taken as equivalent to 1.4 parts by weight of lime. The iron content does not have to be considered since the iron forms iron phosphide and does not combine with silica and go into the slag. On this basis, in the above rock there are for each three molecules of CaO 2.27 molecules of $SiO_2$. Usually the number of molecules of $SiO_2$ should be between 2 and 3. One molecule only gives a very difficultly fusible highly basic slag. Four molecules give an equally difficultly fusible but highly acid slag. It will be understood that where, in the specification and claims, reference is made to the relationship between the CaO and $SiO_2$ the terms CaO and $SiO_2$ include not merely these specific chemical substances but also equivalents therefor calculated as CaO and $SiO_2$ respectively. It will also be understood that with highly siliceous or highly aluminous material it may be necessary to add lime to secure the desired balance between the basic and acidic constituents and that the invention includes the treatment not only of raw material which is self-fluxing but also material which requires the addition of either silica or lime.

The quantity and nature of reducing material used must be sufficient not only to reduce the $P_2O_5$ content of the charge to elemental phosphorus and to reduce any other reducible compounds, but also to produce and maintain a reducing atmosphere consisting chiefly of carbon monoxide and hydrogen and substantially free from oxygen and carbon dioxide within and immediately adjacent the charge.

The production of this protective non-oxidizing atmosphere within and immediately adjacent the surface of the charge is conveniently obtained in two ways, first by the evolution of reducing gases within the charge and second, by using an excess of reducing material so that such excess in the form of carbon may float on the lake of slag after the charge has melted down. Such floating carbon continues to react with any unreduced phosphates and/or phosphorus pentoxide which may still persist, and as a result of this reducing action, elementary phosphorus volatilizes out of the molten mass, is later oxidized and then becomes part of the material leaving the furnace with the flue gases.

The evolution of reducing gases within the charge is aided by the use of bituminous or semi-bituminous coal (both hereinafter referred to as bituminous coal), or other reducing material containing volatile combustible matter, instead of coke. The first action of heat on the charge is to coke such coal or the like and the hydrogen and hydrocarbons pass through the charge into the furnace thereby removing air from the voids. Further the hydrocarbons are largely decomposed by the heat of the surface layers of the charge and of the furnace into carbon and hydrogen. The carbon formed deposits on the surface of the solid particles of the phosphate rock and is thus brought into intimate contact with the material to be reduced. The hydrogen gas also contacts with the phosphate rock and exerts a reducing action thereon.

Good results have been obtained in practice, with rock of the composition above set forth, using 15%, by weight on the rock, of bituminous coal crushed to 4 mesh or finer.

The carbon and hydrogen contained in this amount of coal is much in excess of that theoretically required for the reduction of the phosphorus pentoxide to phosphorus. A part of this excess is consumed in reducing the iron present to iron phosphide. Another part is employed to provide a floating layer of coke on top of the slag to ensure the desired substantially oxygen and carbon dioxide free atmosphere within and adjacent the charge and slag made therefrom.

The use of coal as the reducing agent for the charge has the further advantage that steam is formed by the combustion of the hydrogen of the coal. Usually where values are carried off in suspension in the flue gases, as they are in the present invention, the presence of large amounts of water vapor in the flue gases from the furnace is to be avoided as it hinders the separation of the values and gives a moist, sticky product requiring drying. I have found, however, that in the present case, a considerable moisture content in the flue gases is a distinct advantage. This steam or moisture content may be used to form phosphoric acids or solutions thereof by merely cooling the furnace gases. In the present process it is therefore advantageous that steam be also introduced as the result of the burning of the fuel used to fire the furnace.

In actual practice I have found that about 5% (on the rock treated) of coal is sufficient to fire the furnace, if preheated air is used. The hydrogen content of the 15% of coal added to the charge and of the 5% used to fire the furnace is ample to provide all the steam or water vapor required. With coal containing 5% of hydrogen there is formed 9% of water vapor by weight, based on the rock treated. 9 parts of water combine with 35.5 parts of $P_2O_5$ to form pyrophosphoric acid, $H_4P_2O_7$, with 23.6 parts of $P_2O_5$ to form orthophosphoric acid, $H_3PO_4$. Using the mixture of rock and coal above mentioned there is, therefore, in the gases drawn from the furnace more than enough water vapor to combine with all of the phosphorus pentoxide formed and carried out with such gases to form either pyro- or ortho-phosphoric acid.

It is evident, of course, that where the furnace is fired by oil or natural gas, the quantity of water vapor formed will be much larger since the hydrogen content of the former is around 15% instead of 5% for coal, while the hydrogen content of the latter is around 30%. Therefore, when using such firing fuels, enough steam may be formed even when coke instead of bituminous coal is added to the charge as the reductor.

One molecule of phosphorus pentoxide may combine with one, two or three molecules of water to form meta-, pyro- and ortho-phosphoric acids respectively. The former resembles glass in its physical characteristics and does not form a mobile liquid when heated at atmospheric pressures. Pyro-phorsphoric acid, however, melts at 61° C. to form a mobile liquid and orthophosphoric acid acts in the same way at 38° C. This property may be utilized according to the present invention to enable either or both of the latter acids to be obtained substantially pure and free from water, other than water of combination. If gases containing water-vapor and phosphorus pentoxide are cooled to between 250° and 350° C. a liquid condensate is obtained, consisting of phosphoric acids having less water of composition than orthophosphoric acid and probably consisting chiefly of pyrophosphoric acid. At about 160° C. and upwards to around 215° C. orthophosphoric acid in substantially anhydrous form is condensed in liquid form. At lower temperatures, the acid contains increasing amounts of water, the water content depending upon the temperature so long as any excess of water vapor is present in the gases.

Various methods of collecting the finely divided phosphorus pentoxide and/or phosphoric acids may be used. For example electrical precipitation may be used, by the Cottrell method, either alone or as a supplement to other collecting methods.

A further method, having certain advantages over the electrical precipitation method in that it provides means for cooling as well as collecting the values from the flue gases, is based on the fact that both the pyro- and ortho- acids are liquids at the temperature of their condensation so that these acids may be employed to cool the gases either wholly or in part and at the same time bring about the collection and condensation of their acid content. This may be done in various ways, one being to pass the hot gases upwardly through a tower, down which phosphoric acid is flowing, the acid collecting at the bottom being passed through a cooling chamber and then pumped to the top of the tower again. By adjusting the relative rates of flow of the hot gases and of acid down the tower and the temperatures of the hot gases and the recycled acid any desired product may be obtained ranging from pyrophosphoric acid with some metaphosphoric acid down to a water solution of orthophosphoric acid. The condensate may be drawn off from time to time or continuously, taking care, of course, to leave sufficient acid for re-cycling through the tower and cooling chamber.

While the invention is capable of being carried out in variously arranged forms of apparatus, I have illustrated more or less diagrammatically in the accompanying drawing one arrangement of plant which is suitable for practicing the invention.

Figure 3 shows on an enlarged scale and in side elevation the reverberatory furnace.

Figure 4 is a section on the line 4—4 of Fig. 3.

Figure 5 is a section on the line 5—5 of Fig. 3.

Figure 1:
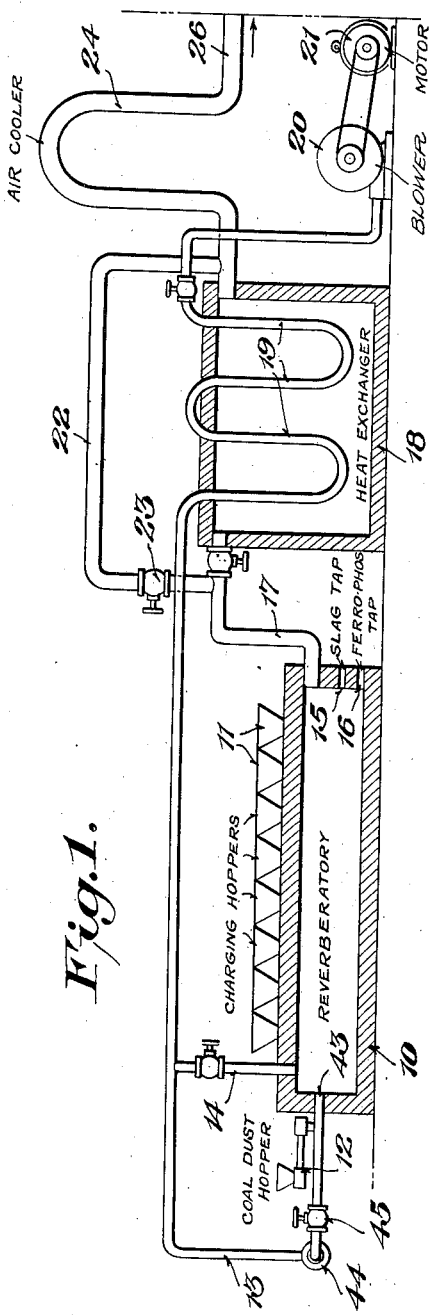
Figure 1 shows diagrammatically the first portion of a plant suitable for carrying out the invention.
Figure 2:
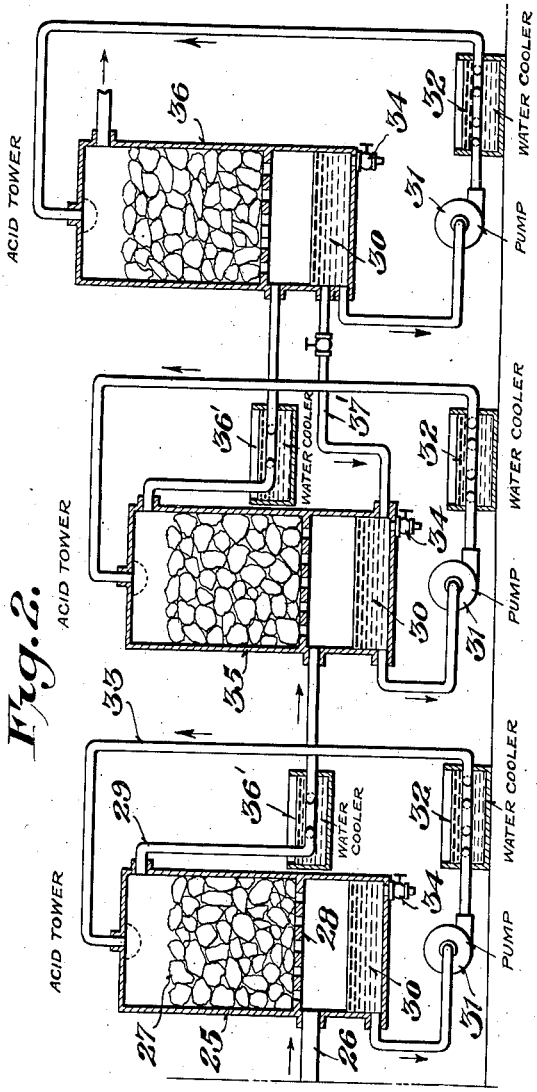
Figure 2 shows the second portion of such plant.

The plant comprises a reverberatory furnace 10 with a series of charging hoppers 11 along each side. All of the hoppers are supplied with the regular standard charge of phosphate rock and coal with or without additional silica or lime. The charge so introduced will be reduced and melted down at varying rates dependent upon the furnace temperature at each point. At a point near the firing end the reduction and melting down of the charge will take place at the maximum rate so that while charging occurs the full length of the furnace the greater part of the slag is formed in the firing half of the furnace and consequently the average distance the slag has to flow before discharge will be around 40 feet for a furnace 65 feet long.

The details of the reverberatory are shown in Figs. 3, 4 and 5. The hearth 37 is formed with inclined side walls 38, between the upper edges of which is sprung the furnace arch 39. Along each side of the roof are apertures to receive the spouts of the hoppers 11. The charge introduced into these hoppers flows downwardly into the furnace until the outer surfaces of the resulting piles of loose material below the hoppers have reached the angle of repose, further flow of charge then ceases. As the charge reduces and melts down to form the lake of slag 41 and layer 42 of ferrophos therebeneath, fresh material automatically feeds downwardly from the hoppers toward the slag so as to maintain a constant angle of repose at the surface 40. The material sliding down into the furnace is turned over and over and thoroughly mixed. There is, therefore, no inert pile of charge but instead a constantly moving mass.

A very slight negative (sub-atmospheric) pressure is maintained in the furnace so as to prevent combustible gases escaping through cracks in the furnace and through the materials in the hoppers and burning. To prevent excessive flow of air through the charge in the hoppers the charge should be reasonably fine, say 4 mesh or under.

The reverberatory may be fired in any convenient way by oil or gas, or by powdered coal or lump coal, when a grate is used. As shown, the firing is by powdered coal from a hopper 12 blown into the furnace through burners by heated air from a pipe 13. Additional air may be supplied, if desired by a by-pass 14 around coal dust burners. To produce uniform heating, a plurality of burners 43 may be used. In the drawings (Fig. 4) five of such burners are shown. These burners are all connected to a header 44 and valves 45 are provided to enable one or more of the burners to be cut out, if desired. Each burner has its own powdered coal hopper 12 from which powdered coal is fed to the burner by a worm 46 rotated in any convenient manner.

The charge is reduced and melted down in the furnace, and the molten slag formed is drawn off through an aperture 15 at the end of the furnace. As already explained, any iron present in the charge forms ferrophos and this, being heavier than the slag, forms a molten layer beneath the slag and may be drawn off from time to time through an aperture 16. It will be noted that the slag and ferrophos outlets are offset with respect to each other so that discharge from both outlets may occur simultaneously.

The furnace gases carrying phosphorus values, mostly as phosphorus pentoxide ordinarily, pass by a flue 17 to a heat exchanger 18. Various forms of heat exchanger may be used but one of the most satisfactory, for reasons already given, is the double-surface type. As shown the exchanger comprises a brickwork chamber with a series of loops 19 of iron pipe depending from the roof through which the air to be preheated is forced by a blower 20 driven by a motor 21. Any number of these pipe loops may be provided, their disposition and aggregate length being a function of the amount of heat exchange desired. A by-pass 22, controlled by a valve 23, furnishes means for passing part of the gases from the reverberatory furnace around the heat exchanger, if desired, to lower the temperature of the air for combustion. The pipes 19 are of metal, iron in the present example; but, assuming the plant to have been preliminarily put in running condition, said pipes are already covered by a protective layer of condensed phosphatic material from the furnace, as before explained; and therefore said pipes may be exposed, without danger of destruction, to a temperature well above the destructive temperature for iron. According to one method of preliminarily effecting this protective coating of the heat exchanger pipes, the furnace may be initially operated at a reduced rate and in such manner that the furnace gases entering the heat exchanger are at a temperature below that destructive to the iron pipes, opportunity being thus afforded for deposition of the necessary amount of material on the pipes to form a protective layer.

After the first deposit of flue dust and phosphoric acid on the pipes there is much less tendency for such materials to adhere and the heavier particles carried by the flue gases simply drop to the bottom of the chamber whence they can be removed in any convenient manner without interrupting operation of the furnace.

From the heat exchanger the gases pass through an air cooler 24 and thence to one or more acid towers, three of which are shown, by way of example, although more may be used, if desired.

The flue gases enter the first tower 25 by a pipe 26 and pass upwardly through a mass of brick checkerwork or tiles or broken inert material 27 supported by a grid 28 and pass out by a pipe 29.

At the bottom of the tower is a pool 30 of phosphoric acid which is drawn off by a pump 31, forced through coils in a water cooler 32 and then through pipe 33 to the top of the tower where it is sprayed over the material 27. By rapidly recirculating phosphoric acid in closed cycle in the manner indicated the flue gases are thoroughly scrubbed and substantially all the flue dust which does not settle out in the heat exchanger is removed. A part of the phosphoric acid content of the gases is also removed at the same time. The acid condensed containing the flue dust washed out may be drawn off from time to time through a cock 34.

The material so drawn off, like that obtained by settling in the heat exchanger, is suitable for use as a fertilizer since it contains enough phosphoric acid to render the whole $P_2O_5$ content available as a plant food.

The collection of phosphoric acid by liquids, whether by phosphoric acid or by solutions of phosphoric acid, or by water, does not take place as readily as the collection of solid foreign matter such as flue dust. Hence this first tower may be employed to remove the greater part of the flue dust and at the same time allow a large proportion of the suspended phosphoric acid to pass on to the other towers for cooling and extraction of their remaining acid content. To obtain this result the rate of re-circulation of the acid in the first tower is kept relatively low as compared with the rate of recirculation of the acid in the second and third towers.

The flue gases largely freed from flue dust in the tower 25 but still containing considerable phosphoric acid pass by pipe 29 to a second tower 35, if desired, being cooled in transit by a water cooler 36'. The purpose of this tower in the arrangement shown is to form acid having less water of combination than orthophosphoric acid and consisting chiefly of pyrophosphoric acid. The construction and general method of operating this second tower is similar to that of the first tower, so detailed description is unnecessary. The same is true of the third tower 36. The second and third towers are, however, arranged so that the acid condensed in the third may be allowed to overflow by a pipe 37' into the bottom of the second tower to enable a part of the orthophosphoric acid formed in the third tower to be converted in the second tower into acid having less water of composition, such as pyrophosphoric acid, by evaporation of water or condensation of acid.

By way of illustrating one method of operating the plant above described the following table of gas temperatures may be given.

Gases leave the furnace at 1200° C.
Gases leave the heat exchanger at 350° C.
Gases leave the air cooler at 325° C.
Gases leave the first tower at 300° C.
Gases leave the second tower at 225° C.
Gases leave the third tower at 150° C.

The heat removed at the various stages in the operation is not merely the specific heat of the gases and material carried in suspension thereby but also the heat of combination of the water vapor with the $P_2O_5$ first to form meta-, then pyro- and finally ortho-phosphoric acid.

These temperatures may be varied in accordance with the products desired and the relative amounts of each of such products. It will also be understood that where electrical precipitation is employed, such as the Cottrell system, there may be a series of precipitating chambers in which not only the temperatures are adjusted but also the voltages impressed so that a series of differentiated products may be obtained in the various chambers. Further electrical precipitation may be used after tower treatment to give the gases a final cleaning action.

While I have described my process and apparatus with particular reference to the production of phosphoric acids they are also applicable, with suitable modification, to the production and collection of elemental phosphorus. In this case, however, reducing conditions must be maintained throughout the furnace and up to the point at which the elemental phosphorus is separated. Whatever precautions are observed some oxidation of the phosphorus would doubtless occur so that such process could advantageously be operated so as to produce and collect both elemental phosphorus and phosphoric acid.

It will also be understood that, inasmuch as the charge itself gives off combustible gases, a considerable part of the heating as well as the reduction of the charge will be brought about by the reducing material introduced into the charge; but suitable regulation of the heating of the furnace and the control of the operation for satisfactory functioning of the process will be attained only by varying from time to time the amount of the powdered coal or other fuel with which the furnace is fired by burner means, as described. In any case, it is always vitally necessary to maintain virtually intact the protective blanket of reducing gases adjacent the surface of the charge.

What is claimed is:

1. The process of treating phosphates which comprises preparing a mixture comprising a phosphate, sufficient siliceous matter to form a fusible slag and carbonaceous material in excess of that required to reduce the phosphorus pentoxide content of the mixture to free phosphorus, heating the mixture in a fuel-fired reverberatory furnace to a temperature sufficient to drive off free phosphorus while maintaining a substantially oxygen- and carbon-dioxide-free atmosphere within the mixture and in the form of a protective envelope immediately adjacent the charge, said furnace being fired to give a current through the furnace of combustion gases which are somewhat oxidizing in character, the charge being so disposed in the furnace that said current sweeps generally parallel to the surface of the charge substantially without impinging directly thereon, whereby the evolved phosphorus vapors leave the charge while it is still largely unmelted substantially without being oxidized and, after passing through said envelope, then mix with said combustion gases in the reverberatory furnace, and recovering phosphorus values from the gases and vapors leaving the furnace.

2. The process as in claim 1 in which the carbonaceous material contains considerable volatile matter.

3. The process as in claim 1 in which the carbonaceous material comprises bituminous coal.

4. The process as in claim 1 in which the mixture treated is fed into the furnace along the side.

5. The process as in claim 1 in which the greater part of the mixture treated is fed into the furnace along the firing half of the furnace, while the molten slag produced is drawn off at the opposite end of the furnace.

6. The process as in claim 1 in which sufficient carbonaceous material is added to enable a floating layer of carbonaceous material to form over the lake of slag in the furnace.

7. The process of treating phosphates which comprises preparing a mixture comprising a phosphate, sufficient siliceous matter to form a fusible slag and carbonaceous material in excess of that required to reduce the phosphorus pentoxide content of the mixture to free phosphorus, and heating the mixture in a reverberatory furnace, substantially without heating-flame impingement upon the mixture, to a temperature sufficient to produce molten slag and to drive off free phosphorus.

8. The process of treating phosphates which comprises firing a heating zone to produce therein flame and hot combustion gases containing constituents oxidizing toward free phosphorus, charging into said zone a mixture comprising a phosphate, sufficient siliceous matter to form a fusible slag and carbonaceous material in amount exceeding that required to reduce the oxidized phosphorus content to free phosphorus, the charging being effected in such manner as to form a charge pile presenting a free or unconfined face operatively adjacent said flame and hot combustion gases but not substantially impinged thereby, while maintaining the remainder of said charge pile unexposed and positively confined, reverberating heat from said flame and hot combustion gases upon said free or unconfined face, whereby free phosphorus and reducing gases are evolved in said charge pile and are forced to flow outwardly therefrom at said free or unconfined face, while the mixture is still largely unmelted, to form and continually renew a protective gaseous layer non-oxidizing toward phosphorus, which layer repels or positively prevents access of said combustion gases to said face, and recovering phosphorus values from the gases and vapors leaving said zone.

9. The process of treating phosphates which comprises preparing a mixture comprising a phosphate, sufficient siliceous matter to form a fusible slag and carbonaceous material in excess of that required to reduce the oxidized phosphorus content to free phosphorus, firing a heating zone to produce flame and hot combustion gases which contain constituents oxidizing toward phosphorus and which sweep through said zone in a generally predetermined path, charging said mixture into said heating zone in such manner as to form a charge pile presenting one free or unconfined face operatively adjacent said flame and gases but not substantially impinged thereby, while maintaining the remainder of said charge pile unexposed and positively confined, reverberating heat from said flame and hot combustion gases upon said free or unconfined face, whereby free phosphorus and reducing gases are evolved in said charge pile and are compelled to flow outwardly therefrom at said free or unconfined face while the mixture is still largely unmelted, thereby positively preventing access of the oxidizing atmosphere of the heating zone to said face, and recovering phosphorus values from the gases and vapors leaving said zone.

10. The process of treating prosphates which comprises preparing a mixture comprising a phosphate, sufficient siliceous matter to form a fusible slag and carbonaceous material in excess of that required to reduce the oxidized phosphorus content to free phosphorus, firing an elongated heating zone to produce flame and hot combustion gases which contain constituents oxidizing toward phosphorus and which sweep through said zone in a direction generally lengthwise thereof, charging said mixture into said zone in a substantially sheet-like body in such manner as to present a free or unconfined face thereof to said flame and gases laterally of their general line of sweep while avoiding direct impingement thereof on said face and positively confining said body at its opposite face, reverberating heat from said flame and hot combustion gases upon said free or unconfined face, whereby free phosphorus and reducing gases are evolved in said body of charged mixture and are compelled to flow outwardly therefrom at said free or unconfined face while the mixture is still largely unmelted, thereby positively preventing access of the oxidizing atmosphere of the heating zone to said face, and recovering phosphorus values from the gases and vapors leaving said zone.

11. The process as defined in claim 10 wherein the described heating of the charge is at temperatures on the order of 1200° to 1400° C. and always much below 1800° C. as a maximum.

12. The process as defined in claim 10, wherein the stated charging of the mixture is continuous, and fused material continuously flowing from said body of charged mixture is subjected to further reverberatory heating by said flame and gases for removal of additional phosphorus values therefrom before being discharged from the heating zone.

13. The process as defined in claim 10, wherein the stated charging of the mixture is continuous, and fused material continuously flowing from said body of charged mixture is subjected to further reverberatory heating by said flame and gases for removal of additional phosphorus values therefrom before being discharged from the heating zone, the surface of the fused material being also protected during such further heating from the oxidizing action of the combustion gases.

14. The process as defined in claim 10, wherein the operating temperatures are on the order of 1200° to 1400° C. and always much below 1800° C. as a maximum.

15. The process of treating phosphates which comprises preparing a mixture comprising a phosphate, sufficient siliceous matter to form a fusible slag and carbonaceous material in excess of that required to reduce the oxidized phosphorus content to free phosphorus, firing a heating zone to produce flame and hot combustion gases which sweeps through said zone in a generally predetermined path, charging said mixture into said heating zone in such manner as to form a charge pile presenting one free or unconfined face operatively adjacent said flame and gases but not substantially impinged thereby, while maintaining the remainder of said charge pile unexposed and positively confined, reverberating heat from said flame and hot combustion gases upon said free or unconfined face, whereby free phosphorus and reducing gases are evolved in said charge and are compelled to flow outwardly therefrom at said free or unconfined face while the mixture is still largely unmelted, thereby positively preventing access of combustion gases to said face, maintaining throughout the heating zone an atmosphere that is reducing to such an extent that a substantial part of the free phosphorus evolved in the charge remains unoxidized after passing therefrom into such atmosphere, and recovering phosphorus values from the gases and vapors leaving said zone.

LEWIS B. SKINNER.